United States Patent
Yoshida et al.

(10) Patent No.: US 7,787,968 B2
(45) Date of Patent: Aug. 31, 2010

(54) SAFE PLC, SEQUENCE PROGRAM CREATION SUPPORT SOFTWARE AND SEQUENCE PROGRAM JUDGMENT METHOD

(75) Inventors: Youji Yoshida, Kariya (JP); Satoshi Kato, Kariya (JP); Tsutomu Araki, Okazaki (JP); Mitsushi Nishi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 819 days.

(21) Appl. No.: 11/658,266

(22) PCT Filed: Jul. 22, 2005

(86) PCT No.: PCT/JP2005/013906

§ 371 (c)(1),
(2), (4) Date: Apr. 2, 2007

(87) PCT Pub. No.: WO2006/011584

PCT Pub. Date: Feb. 2, 2006

(65) Prior Publication Data

US 2008/0312755 A1    Dec. 18, 2008

(30) Foreign Application Priority Data

Jul. 29, 2004    (JP) .............................. 2004-221734

(51) Int. Cl.
*G06F 19/00* (2006.01)
(52) U.S. Cl. ............................. 700/23; 700/168; 714/42
(58) Field of Classification Search ................... 700/23, 700/17–19, 83, 96, 145, 169, 182; 714/42–43
See application file for complete search history.

(56) References Cited

U.S. PATENT DOCUMENTS

| | | | | |
|---|---|---|---|---|
| 5,206,572 A | * | 4/1993 | Farag et al. | 318/778 |
| 6,038,669 A | * | 3/2000 | Yang | 713/300 |
| 2004/0205407 A1 | * | 10/2004 | Sakakibara et al. | 714/31 |
| 2005/0262856 A1 | * | 12/2005 | Street et al. | 62/129 |

FOREIGN PATENT DOCUMENTS

| | | |
|---|---|---|
| EP | 1 396 772 A1 | 3/2004 |
| JP | 09-128014 | 5/1997 |
| JP | 2002-358106 | 12/2002 |
| WO | 2002/097543 | 12/2002 |
| WO | WO 2004/057430 A1 | 7/2004 |

OTHER PUBLICATIONS

Jochen OST, et al., "PLCopen Safety—Sichere Funktionsbausteine in ihrer Anwendung", PLCOPEN, XP002519811, Apr. 1, 2005, 10 pages, with partial English translation.

* cited by examiner

*Primary Examiner*—Kidest Bahta
(74) *Attorney, Agent, or Firm*—Oblon, Spivak, McClelland, Maier & Neustadt, L.L.P.

(57) ABSTRACT

Preparation supporting software for sequence programs in a safety PLC capable of rewriting sequence programs, wherein the preparation supporting software for sequence programs judges whether or not an output section corresponding to an object sequence program is of the configuration ensured to be safe, based on input device kind information, which stores first kind information indicative of safety ensured or second kind information indicative of safety not ensured in correspondence to each input device, and the object sequence program, and displays the result of the judgment distinguishably.

6 Claims, 7 Drawing Sheets (A)

(B)

(C)

(A)

| Input Terminal Number | Input Device Name (Number) | Input Device Kind |
|---|---|---|
| 1 | I001 | S |
| 2 | I002 | S |
| 3 | I003 | (−) |
| : | : | : |

← 51a (B)

| Output Terminal Number | Output Device Name (Number) |
|---|---|
| 1 | M001 |
| 2 | M002 |
| 3 | M003 |
| : | : |

← 51b (C)

(A)

Serial Case (S and (-))

Parallel Case (S and (-))

(B)

Serial Case (S and U)

Parallel Case (S and U)

(C)

Serial Case ((-) and U)

Parallel Case ((-) and U)

(A)

(B)

n01~n02 : No combined element (C)

Combined Result of "I001" and "I002" Serial Circuit = "I001A"

Combined Result of "A circuit (I001A)" and "I003" Parallel Circuit = "I003A"

(D)

51c

| Sequence Number | Output Section | Output Section Judgment | Input 1 | Input 1 Judgment | Input 2 | Input 2 Judgment | Input 3 | Input 3 Judgment | ... |
|---|---|---|---|---|---|---|---|---|---|
| 001 | M001 | U | I001 | S | I002 | S | I003 | U | ... |
| : | : | : | : | : | : | : | : | : | : |
| : | : | : | : | : | : | : | : | : | : |

(A)

(B)

(A) (Before Modification)

Addition of "Input I005" to Sequence Program "002"

(B) (After Modification)

(C)

| Sequence Number | Output Section | Output Section Judgment | Input 1 | Input 1 Judgment | Input 2 | Input 2 Judgment | Input 3 | Input 3 Judgment | ... |
|---|---|---|---|---|---|---|---|---|---|
| 002 | M002 | U | I001 | S | I002 | S | I005 | U | ... |
| 003 | M003 | (−) | I003 | (−) | I004 | (−) | : | : | : |
| 004 | M004 | U | M002 | U | M003 | (−) | : | : | : |
| : | : | : | : | : | : | : | : | : | : |

51c

SAFE PLC, SEQUENCE PROGRAM CREATION SUPPORT SOFTWARE AND SEQUENCE PROGRAM JUDGMENT METHOD

TECHNOLOGICAL FIELD

The present invention relates to a safety PLC capable of rewriting sequence programs each for controlling an output device by a combination of a plurality of input devices, preparation supporting software for sequence programs to be written into the safety PLC, and a judgment method, for sequence programs.

BACKGROUND ART

Heretofore, in production lines or the like in factories, conventional PLCs (Programmable Logic Controller) have been in use to input signals (ON or OFF information) relating to the conductive states from various input devices (switches, sensors and so on) and to control (to output ON or OFF signals or so to) output devices (relays, motors and the like) by the use of sequence programs in which the various input devices are combined in desired configurations (combined in serial or parallel).

When preparing a sequence program in which input devices arbitrarily selected from among various input devices are arbitrarily combined serially and parallelly, a user usually prepares a ladder circuit by the use of preparation supporting software for sequence programs, prepares data based on the prepared ladder circuit and inputs the date into a conventional PLC for enabling the conventional PLC to perform a desired operation.

In recent years, requirements are increasing for so-called safety PLCs which are specialized for safety over the conventional PLCs. In the safety PLCs, it is ideal that input devices ensured to be safe are used to make outputs to output devices those ensured to be safe. However, it may actually be the case that all the input devices are not those input devices ensured to be safe. Where a sequence program is prepared with the mixture of input devices ensured to be safe and those input devices not ensured to be safe, the user has to judge whether an output to an output device has been ensured to be safe or not.

In Patent Document 1 as prior art, there is proposed a safety controller which is capable of realizing fail-safe functions while being simplified in the construction of a unit alone and is capable of reducing the cost not only as the unit alone but also as an entire system.

Patent Document 1 is Japanese unexamined, published patent application No. 2002-358106.

When preparing a sequence program (ladder circuit or the like) by the use of preparation supporting software for sequence programs, it is possible for the user not only to use input devices of any kinds but also to make any combinations (serial or parallel combinations).

Therefore, it may occur that a sequence program can be prepared wherein input devices ensured to be safe and input devices not ensured to be safe are mixed and are complicatedly combined in serial or parallel. The judgment of whether or not the output section of the sequence program (in particular, the output section of a sequence program with several tens to several hundreds input devices being combined) prepared in this way has been carried out by the handwork of the user and has required massive manpower. Further, the judgment by the handwork of the user has involved a risk of wrong judgments.

The reason is that where input devices ensured to be safe are mixed with those not ensured to be safe, there exist a combination ensured to be safe (serial and the like) and another combination not ensured to be safe (parallel and the like).

In the prior art of Patent Document 1, although the reliability in arithmetic results is enhanced by placing a prepared sequence program under arithmetic processing by a plurality of CPUs to compare the results, it is unable to enhance the safeness of the sequence program itself.

Further, as other prior art, there is one in which settings have been made in advance regarding whether each input device is safe or not and in which any input device not ensured to be safe is distinguishably displayed when a sequence program (ladder circuit or the like) is displayed by the use of preparation supporting software for sequence programs. However, the display is made only of whether each input device itself is safe or not, and whether an output of the sequence program is that output ensured to be safe or not has to be judged finally by the handwork of user at the cost of massive manpower.

The present invention has been created taking the aforementioned respects into consideration, and the problem to be solved is to provide a safety PLC, preparation supporting software for sequence programs and a judgment method for sequence programs which are capable of automatically judging whether an output section of a sequence program is the output ensured to be safe or not and capable of enabling a user to judge whether the output section is the output ensured to be safe, within a short period of time and precisely.

DISCLOSURE OF THE INVENTION

As measures for solving the foregoing problem, a first invention aspect of the present invention is a safety PLC which is capable of rewriting sequence programs which PLC comprises input means for inputting signals relating to the conductive states of a plurality of input devices, storage means for storing sequence programs each configured by combining in series or parallel arbitrary input devices selected from the inputted input devices, arithmetic means for obtaining an arithmetic result based on a sequence program and signals relating to the conductive states of respective input devices, and output means for outputting the arithmetic result of the arithmetic means from an output section to control an output device.

In correspondence to each input device, the storage means stores input device kind information which stores first kind information indicative of safety ensured or second kind information indicative of safety not ensured.

Then, the safety PLC judges whether or not a sequence program corresponding to the output section is of the configuration ensured to be safe, based on the sequence program and the input device kind information and when judging that the configuration is not ensured to be safe, sends an output to alarming means and controls an output device connected to the output section toward the safe side.

Where the safety PLC in the first aspect is employed, since the safety PLC automatically judges whether or not the output of the sequence program is of the configuration ensured to be safe, the handwork of the user is not needed, so that the user is enabled to judge whether or not the output is that ensured to be safe, more accurately within a shorter period of time. Further, since an alarm is given when it is judged not to be ensured to be safe, the use can reliably recognize that safety is not ensured, Further, it is expedient that the output device is controlled toward the safe side when it is judged that safety is not ensured.

Further, a second aspect of the present invention is preparation supporting software for sequence programs in a safety PLC capable of rewriting sequence programs which PLC comprises input means for inputting signals relating to the conductive states of a plurality of input devices, storage means for storing sequence programs each configured by combining in series or parallel arbitrary input devices selected from the inputted input devices, arithmetic means for obtaining an arithmetic result based on a sequence program and signals relating to the conductive states of respective input devices, and output means for outputting the arithmetic result of the arithmetic means from an output section to control an output device.

Based on input device kind information, which stores first kind information indicative of safety ensured or second kind information indicative of safety not ensured in correspondence to each input device, and based on an object sequence program, the preparation supporting software for sequence programs judges whether or not an output section corresponding to the object sequence program is of the configuration ensured to be safe, and distinguishably displays a result of the judgment.

According to the preparation supporting software for sequence programs in the second aspect, the preparation supporting software for sequence programs automatically judges whether or not the output of the object sequence program is of the configuration ensured to be safe.

Then, the user can judge whether or not the output is that ensured to be safe, by looking at the judgment result (judgment result of whether it is ensured to be safe or not) which is displayed distinguishably.

Thus, the handwork by the user is not needed, and the user can judge whether or not the output is that ensured to be safe, within a shorter period of time and more accurately.

Further, a third aspect of the present invention is the preparation supporting software for sequence programs as described in the second aspect, wherein the preparation supporting software for sequence programs can be set to prohibit the writing of the object sequence program into the safety PLC when judging that the output section corresponding to the object sequence program is of the configuration not ensured to be safe.

The preparation supporting software for sequence programs as described in the third aspect is expedient because it can prohibit the user from erroneously writing into the safety PLC the sequence program which is judged not to be of the configuration ensured to be safe.

Further, a fourth aspect of the present invention is the preparation supporting software for sequence programs as described in the second aspect, wherein it is possible to prepare a plurality of sequence programs and wherein it is also possible to utilize an output section of a certain sequence program as an input device of another sequence program.

Further, when an output section judged not to be of the configuration ensured to be safe is selected, the preparation supporting software for sequence programs displays a sequence program which includes an output section first judged not to be of the configuration ensured to be safe and which is selected from among the sequence program and other sequence programs including a cause which made the output section judged not to be of the configuration ensured to be safe, and at the same time, distinguishably displays at least one of an input device and an output device which contributed to the cause in the displayed sequence program.

With respect to the output section of a sequence program which is judged not to be of the configuration ensured to be safe, the preparation supporting software for sequence programs as described in the fourth aspect distinguishably displays an input device (or an input device or an output section of another sequence program) which caused the output section to be so judged. Therefore, in the work for correcting by revision the sequence program to the configuration ensured to be safe, it is possible for the user to understand in a moment which part the revision is to be made at.

Therefore, it is very expedient that the user can recognize the part to be revised, in a short period of time and accurately in the revision by the user of any sequence program.

Further, a fifth aspect of he present invention is a sequence program judgment method of judging whether or not an output section of an object sequence program is of the configuration ensured to be safe, in the safety PLC as described in the first aspect or in the preparation supporting software for sequence programs as described in the second aspect.

First of all, judgment results are classified into three kinds including first kind information indicative of safety ensured at all times, second kind information indicative of safety not ensured at all times and third kind information indicative of safety not ensured as a result of that there may be both of a case that safety is ensured and the other case that safety is not ensured.

When a sequence program is composed of input devices of the first kind information only, it is judged that the judgment result of an output section thereof is the first kind information.

When a sequence program is composed of input devices of the second kind information only, it is judged that the judgment result of an output section thereof is the second kind information.

When a sequence program includes input devices of the first kind information together with input devices of the second kind information, there are employed two judgment methods described below.

Unless a part where the conductive state of an input device of the second kind information has preference to the conductive state of an input device of the first kind information is detected at any part along the routes leading to an output section of a sequence program, it is judged that the judgment result on the output section of the sequence program is the first kind information.

If a part where the conductive state of an input device of the second kind information has preference to the conductive state of an input device of the first kind information is detected at least a part along the routes leading to an output section of a sequence program, it is judged that the judgment result of the output section of the sequence program is the third kind information.

According to the judgment method for sequence programs described in the fifth aspect, when input devices ensured to be safe and input devices not ensured to be safe are mixed, judgment is properly made of the combination (serial and the like) ensured to be safe as well as of the co ation (parallel and the like) not ensured to be safe.

PREFERRED EMBODIMENT TO PRACTICE THE INVENTION

Figure 1:
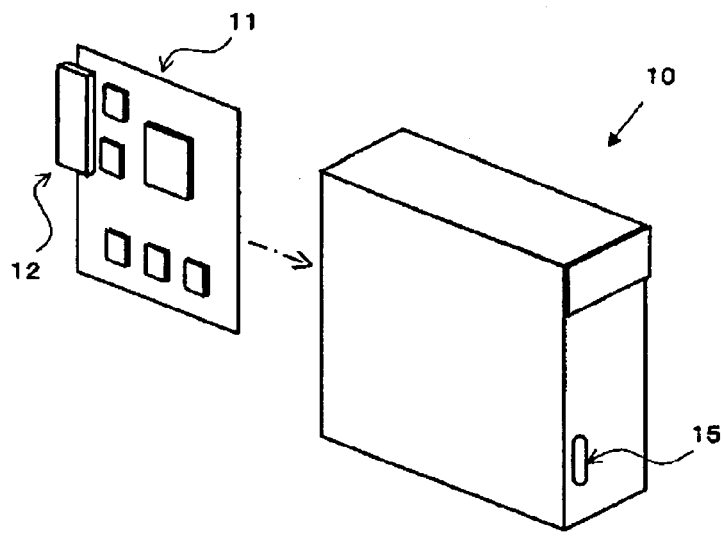
FIG. 1 is illustrations explaining the schematic exterior views of a control unit 10, an input unit 20 and an output unit 30 which constitute a safety PLC 1 according to the present invention.
Figure 1:
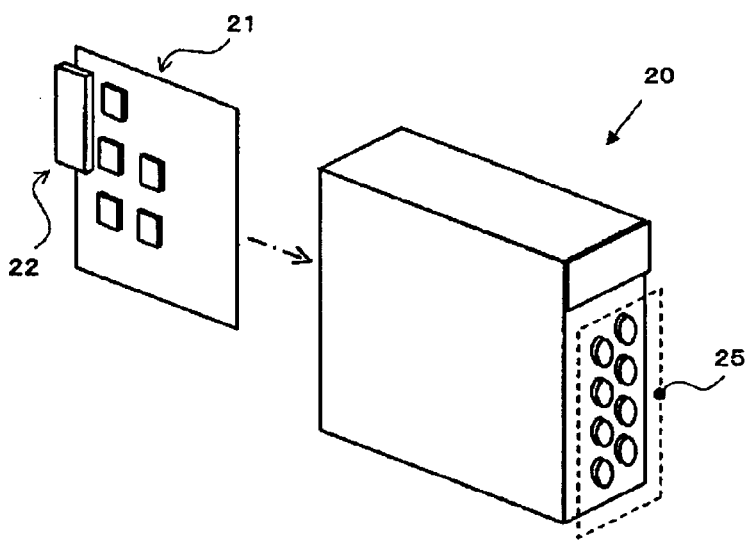
Figure 1:
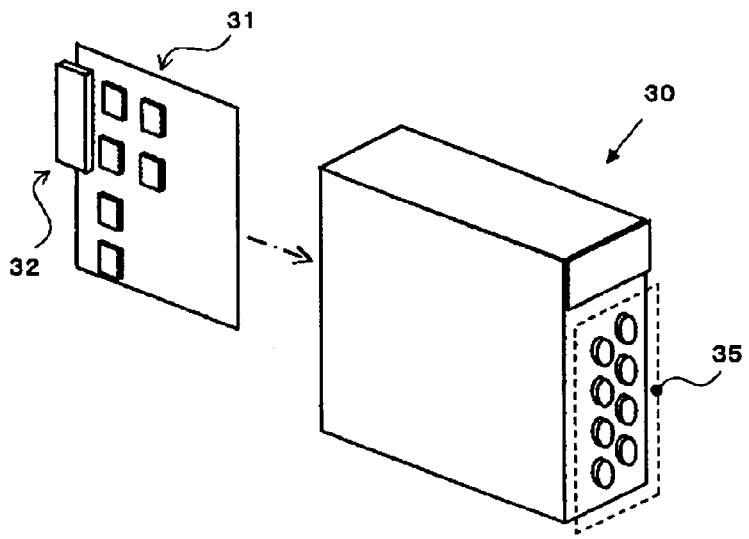

Hereafter, a preferred embodiment for practicing the present invention will be described with reference to the drawings. FIG. 1 shows the schematic exterior views of a control unit 10, an input unit 20 and an output unit 30 which constitute a safety PLC 1 (Programmable Logic Controller) according to the present invention.

[Exterior View of Safety PLC (FIG. 1)]

First of all, FIG. 1(A) to FIG. 1(C) respectively show examples of exterior views of the control unit 10 (corresponding to arithmetic means), the input unit 20 (corresponding to input means) and the output unit 30 (corresponding to output means).

The safety PLC 1 is composed of the control unit 10, the input unit 20 and the output unit 30, and the input unit 20 and the output unit 30 may be increased in number with increases in number of inputs and outputs.

The input unit 20 houses therein an input board 21 having a connector 22 for connection with the control unit 10 and is provided with input terminals 25 to which cables from a plurality of input devices (switches, sensors and the like) are connected.

The output unit 30 houses therein an output board 31 having a connector 32 for connection with the control unit 10 and is provided with output terminals 35 to which cables from a plurality of output devices (relays, motors and the like) are connected.

The control unit 10 houses therein a control board 11 having a connector 12 for connection with the input unit 20 and the output unit 30 and is provided with a connector 15 connectable to a terminal device such as personal computer or the like.

[Example of Block Construction and Connection of Safety PLC (FIG. 2)]

Next, an example of the block construction and connection of the safety PLC 1 will be described with reference to FIG. 2.

Input terminals 25 of the input unit 20 are connected with cables from a plurality of input devices (switch 40a, sensor 40b and so on) and receive signals (ON or OFF information or the like) relating to the conductive states of the plurality of input devices. The received signals relating to the conductive states are transmitted to the control unit 10 through an interface 21a (hereafter, interface will be described as I/F) and the connector 22.

Figure 3:
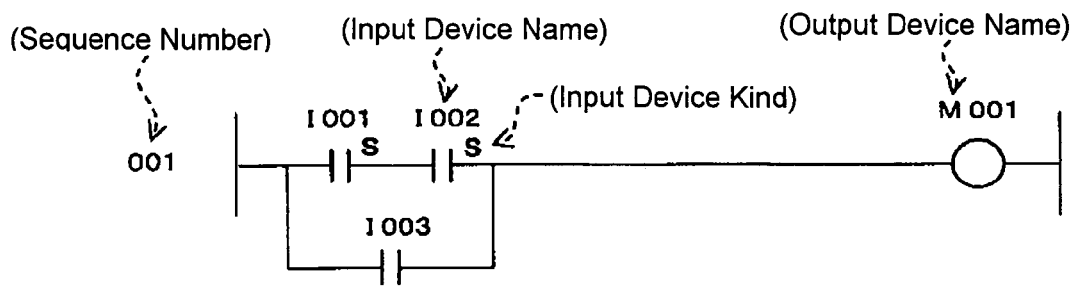
FIG. 3 is explanatory views regarding examples of input device kind information 51a and output device information 51b and an example of sequence programs.

The control unit 10 is composed mainly of a CPU 11a and is provided with a RAM 11b and a ROM 11c (corresponding to storage means). As the ROM 11c, there is used a rewritable ROM such as EEPROM, Flash ROM or the like, and the ROM 11c has stored therein sequence programs each configured with arbitrary input devices being combined in serial or parallel and input device kind information 51a (refer to FIG. 3(A)) which stores first kind information (information indicating that an input device concerned has been ensured to be safe) or second kind information (information indicating that an input device concerned has not been ensured to be safe) in correspondence to each input device. The user is able to prepare the input device kind information 51a by using a terminal device 50, and it is possible to store (write) the prepared input device kind information 51a into the control unit 10.

Further, the ROM 11c has also stored therein a program or the like for performing communication with the terminal device 50, a conventional PCL 60 (another PLC which is not specialized for safety) and the like through I/F 11f.

The CPU 11a outputs arithmetic results, which are based on the sequence programs stored in the ROM 11c and signals relating to the conductive states of respective input devices inputted from the input unit 20 through the connector 12 and the I/F 11d, to the output unit 30 through an I/F 11e and the connector 12.

Communication data with the conventional PLC 60 also includes signals relating to the conductive states of input devices inputted to the conventional PLC (these input devices are classified into the second kind information).

As input devices of the first kind information, there are included an emergency stop button and the like each having a contact composed of double systems. Further, exemplified as input devices of the second kind information are ordinary switches, each composed of a single contact, information and the like relating to input devices inputted from the conventional PLC through communication.

The user is able to start up preparation supporting software for sequence programs by the use of the terminal device 50 and to prepare sequence programs each of which is configured by combining arbitrary input devices in series or parallel. Further, it is also possible to store (write) the prepared sequence programs in the control unit 10.

Cables to a plurality of output devices (a motor 42a, relay 42b and so on) are connected to the output terminals 35 of the output unit 30. Then, the arithmetic results which the control unit 10 obtains based on the sequence programs and the conductive states of respective input devices are outputted to the output devices connected to the output terminals 35 through the connector 32 and an I/F 31a.

[Examples of Input Device Kind Information and Sequence Program (FIG. 3)]

Next, with reference to FIGS. 3(A) to 3(C), description will be made regarding examples of the input device kind information 51a and the output device kind information 51b and also regarding a sequence program (in this instance, a ladder circuit).

As shown in FIG. 3(A), for the input device kind information 51a, an input device name and an input device kind are stored in correspondence to each input terminal number.

"Input terminal name" is a number allotted to each terminal of the connection terminal 25 of the input unit 20.

"Input device name" is a name (identification information) given to an object input device for displaying the input device in a sequence program.

"Input device kind" stores either of the first kind information (indicated as "S" in this instance) or the second kind information (indicated as "(-)" in this instance) in correspondence to an input terminal connected to an object "terminal number".

Further, as shown in FIG. 3(B), as the output device kind information 51b, output device names are stored in correspondence to terminal numbers.

"Output terminal number" is a number allotted to each terminal of the connection terminal 35 of the output unit 30.

"Output device name" is a name (identification information) given to an object output device for displaying the output device in a sequence program.

Next, FIG. 3(C) shows an example (sequence number "001") of sequence programs prepared by the user.

In the example shown in FIG. 3(C), an output device name "M001" (hereafter described as "output M001") is controlled into ON-state when the both of an input device name "I001" (hereafter described as "input I001") and an input I002 come to the conductive states or when an input "I003" comes to the conductive state. Further, the input I001 and the input I002 are given "S" symbol and are indicated to be input devices of the first kind information. Further, the input I003 is given no symbol and hence, is indicated to be of the second kind information. In preparing sequence programs, the user performs such preparation by making the selection and arrangement (location, serial or parallel position) of each input device by the use of the terminal device 50 under the preparation supporting software for sequence programs. The first kind information ("S" in this instance) or the second kind information ("no symbol" in this instance) to be given to the input devices of the sequence program (ladder circuit in this instance) shown in FIG. 3(C) is automatically given by the preparation supporting software for sequence programs by reference to the input device kind information 51a.

In a usual case, the user prepares a plurality of sequence programs for controlling a plurality of output devices by using a plurality input devices. Further, "sequence number" in FIG. 3(C) denotes names (identification information) given to respective sequence programs.

[Example in Automatically Judging Whether Output Section is Safe or not, in Sequence Program (FIG. 4, FIG. 5, FIG. 6)]

(1) Base Rules

Next, examples of base rules in automatic judgment will be described with reference to FIG. 4, and an example of the procedure for actually performing the automatic judgment will be described with reference to FIG. 5.

As sequence programs (ladder circuits in this instance) loaded in the actual safety PLC 1, there are loaded a plurality of sequence programs in which input devices of several tens to several hundreds depending on the scale of a production line facility in use are combined in series or parallel.

Then, progress is made successively with works each for "replacing a serial circuit of two input devices (first kind information through third kind information) with one input device (newly given first kind information through third kind information) by combination" or each for "replacing a parallel circuit of two input devices (first kind information through third kind information) with one input device (newly given first kind information through third kind information) by combination", and judgments are made regarding which of first kind information through third kind information each output section corresponds to.

As already explained, the first kind information is information indicating that safety is ensured (at all times) and is indicated by "S" symbol for enabling the user to distinguish it.

Further, like the first kind information and as already explained, the second kind information is information indicating that safety is not ensured (at all times) and is indicated by "(-) or no symbol" for enabling the user to distinguish it. The indication by "(-)" symbol is used at the input device kind information 51a shown in FIG. 3(A) as well as at judgment record information 51c shown in FIG. 5(D) and FIG. 7(C), whereas "no symbol" is indicated at input devices or output devices (input device I003, output device M003 and the like in FIG. 7(A)) of sequence programs shown in FIG. 3 through 7.

Further, third kind information indicates that it may be the case that the conductive state of an input device of the second kind information has priority over the conductive state of an input device of the first kind information, and in construction, such case corresponds to a circuit configuration of "parallel case (S and (-))" in FIG. 4(A). The third kind information is indicated by "U" symbol for enabling the user to distinguish it.

For information purpose, where priority ranks are given in terms of safety, they may be such priority orders as first kind information "S" (ensured to be safe at all times)>third kind information "U" (not necessarily ensured to be safe)>second kind information "(-) or no symbol" (not ensured to be safe at all times).

Hereafter, description will be made regarding rules for a combination result in the case that a serial or parallel configuration is taken using two input devices of different kinds selected from input devices of the first kind information "S", the second kind information "(-) or no symbol" and the third kind information "U". The serial or parallel combination of input devices of a single kind is combined into (one) input device holding that kind and will be omitted from description. (The combination of "S" and "S" only remains as "S", the combination of "(-)" and "(-)" only remains as "(-)", and the combination of "U" and "U" only remains as "U".)

First, with reference to FIG. 4(A), description will be made regarding combination rules for the combinations of the first kind information "S" and the second kind information "(-) or no symbol".

The combined result of a serial combination of an input device of the first kind information "S" and an input device of the second kind information "(-) or no symbol" can be replaced by (one) input device of the first kind information "S". This is because it is possible to cut off the route by the input device ensured to be safe of the first kind information "S" so that an output section at a latter step is stopped reliably.

On the other hand, the combined result of a parallel combination of an input device of the first kind information "S" and an input device of the second kind information "(-) or no symbol" can be replaced by (one) input device of the third kind information "U". This is because even if it is tried to stop an output section at a latter step by the input device ensured to be safe of the first kind information "S", the route cannot be cut off when the input device not ensured to be safe of the second kind information "(-) or no symbol" is conductive. When the input device not ensured to be safe of the second kind information "(-) or no symbol" is not conductive, it is possible to cut off the route by the input device ensured to be safe of the first kind information "S".

This "circuit in which an input device of the first kind information "S" and an input device of the second kind information "(-) or no symbol" are combined in parallel" corresponds to a "part in which the conductive state of an input device of the second kind information has priority over the conductive state of an input device of the first kind information".

Next, with reference to FIG. 4(B), description will be made regarding combination rules for the combinations of the first kind information "S" and the third kind information "U".

The combined result of a serial combination of an input device of the first kind information "S" and an input device of the third kind information "U" can be replaced by (one) input device of the third kind information "U". This is because even if it is tried to stop an output section at a latter step by the input device ensured to be safe of the first kind information "S", the route in the input device of the third kind information "U" cannot be cut off as indicated to be true with the parallel case shown in FIG. 4(A) when the input device not ensured to be safe of the second kind information "(-) or no symbol" is conductive.

Likewise, the combined result of a parallel combination of an input device of the first kind information "S" and an input device of the third kind information "U" can also be replaced by (one) input device of the third kind information "U". The reason for this is the same as aforementioned and will be omitted from description.

Next, with reference to FIG. 4(C), description will be made regarding combination rules for the combinations of the second kind information "(-) or no symbol" and the third kind information "U".

The combined result of a serial combination of an input device of the second kind information "(-) or no symbol" and an input device of the third kind information "U" can be replaced by (one) input device of the third kind information "U". This is because in the input device of the third kind information "U", as indicated to be true with the parallel case shown in FIG. 4(A), even if it is tried to stop an output section at a latter step by the input device ensured to be safe of the first kind information "S", the route cannot be cut off when the input device not ensured to be safe of the second kind information "(-) or no symbol" is conductive.

Further, the combined result of a parallel combination of an input device of the second kind information "(-) or no symbol" and an input device of the third kind information "U" can also be replaced by (one) input device of the third kind information "U". The reason for this is the same as aforementioned and will be omitted from description.

The base rules as described above have been incorporated in advance into the preparation supporting software for sequence programs, and thus, when the user instructs the execution of automatic judgment, the preparation supporting software for sequence programs uses an object sequence program and the base rules to judge whether an output section of the object sequence program is safe or not, whereby a judgment result is displayed distinguishably. (In this case, the display is made with any of "S", "U" and "(-) or no symbol" being given to the output section.)

(2) Example of Procedure for Automatically Judging Prepared Sequence Program

First of all, the user prepares a sequence program shown in FIG. 5(A) by using the preparation supporting software for sequence programs. Since under the preparation supporting software for sequence programs, the preparation area for each sequence program is to be divided by a plurality of nodes (n01 through n03 in this instance), the user arranges input devices (input I001 through input I003 in this instance) between respective nodes. For example, two or more input devices cannot be arranged in serial between adjoining nodes (two or more input devices can be arranged in parallel). Further, it is possible to arrange an input device between nodes distanced from each other (input I003 is in this case).

When the user instructs the execution of automatic judgment, the preparation supporting software for sequence programs begins to judge whether an output section (output M001 in this instance) of an object sequence program (in this instance, the sequence program of sequence number "001"; hereafter referred to as "sequence program "001"") is of the configuration ensured to be safe or not, that is, which of "S", "U" and "(-) or no symbol" the output M001 corresponds to.

First, as shown in FIG. 5(B), it is judged whether or not a serial circuit is between a first node n01 and a node n02, and in this case, the procedure is advanced to the next because of the absence of any serial circuit. Then, it is judged whether or not a parallel circuit is between the first node n01 and the node n02, and in this case, the procedure is advanced to the next because of the absence of any parallel circuit.

Next, as shown in FIG. 5(C), it is judged whether or not a serial circuit is between the node n01 and a node n03 (a node subsequent to the node 02). In this instance, because of the presence of a serial circuit including an input I001"S" and an input I002"S", the combined result of these is judged (refer to FIG. 4 for the manner of judgment) and is replaced by one input I001A"S" (refer to the sequence program at the upper line in FIG. 5(C)). Since any other serial circuit is present, it is then judged whether or not a parallel circuit is between the node n01 and the node n03. In this case, because of the presence of a parallel circuit including the input I001A"S" and an input I003 "(-) or no symbol", the combined result of these is judged (refer to FIG. 4 for the manner of judgment) and is replaced by one input I003A"U" (refer to the sequence program at the lower line in FIG. 5(C)). The combinations are completed at this time (any other combination cannot be made), so that as a result of the combinations, the output M001 is judged to be of "U" (the third kind information).

While executing the judgment processing for the aforementioned combinations, the preparation supporting software for sequence programs stores in the judgment record information 51c shown in FIG. 5(D) the result of the judgment which it made with respect to the combination of each input device.

The judgment record information 51c is provided with items on sequence number, output section, output section judgment, input n, and input n judgment.

"Sequence number" is a number unique to the sequence program on which automatic judgments were carried out.

Stored in the "output section" is the name (M001 in this instance) of the output of the sequence program.

Stored in the "output section judgment" is the judgment result (any of "S", "U" and "(-) or no symbol") of the output section (M001 in this instance).

Stored in the "input n" are the names (I001, I002, I003) of the input devices in the order that the combinations were carried out.

Stored in the "input n judgment" are the judgment results (any of "S", "U" and "(-) or no symbol") of the combinations each of which was made with an input device concerned. In this instance, it is understood that it is memorized that the judgment result was "U" in the combination using the input I003. Further, it is memorized that the judgment result was "S" in the combination using the input I001 and the input I002.

(3) Display Example of Judgment Results

When the judgment result of an object sequence program is such judgment that it is "U" or "(-) or no symbol" (the third kind information or the second kind information with safety not ensured), the preparation supporting software for sequence programs notifies the user by a judgment result screen 52a exemplified in FIG. 6(A). (When the judgment result is "S" (when safety is ensured), a notice may be given that safety is ensured.)

When the user selects an output section on the judgment result screen 52a, the preparation supporting software for sequence programs displays a sequence program corresponding to the selected output section and specifies an input device causing the judgment result ("U" in this instance) of the sequence program, by reference to the judgment record information 51c (refer to FIG. 5(D)). By reference to the judgment record information 51c shown in FIG. 5(D), the cause which makes the output M001 of the sequence number "001" become "U" is specified as attribution to the input I003 of the input 3 for which the input 3 judgment has stored "U".

Then, as shown in FIG. 6(B), the preparation supporting software for sequence programs displays the sequence program of sequence number "001" corresponding to the output M001 and displays the "U" given to the output M001 and the input I003 having caused the output M001 to be judged as "U", in the manner for the user to distinguish them (for example, a highlight is given by changing the color or the like of the background around each object portion from the area surrounding the background).

(4) Prohibition of Writing into Safety PLC

The preparation supporting software for sequence programs is capable of preparing data from sequence programs (in this case, ladder circuits) prepared by the user and of writing the prepared data into the safety PLC. However, where the result of judging the output of any sequence program is such that there are present at least one or more second kind information "(-) or no symbol" or third kind information "U", the preparation supporting software for sequence programs prohibits the writing of any such sequence program into the safety PLC. Thus, it can be prevented that the user writes by mistake into the safety PLC any such sequence program whose output has not been ensured to be safe.

It may be the case that "the safety of the machine can be ensured to be safe" even when the safety PLC is operated in accordance with a sequence program including an output, such as a simple indication lamp, which does not have any influence on stopping the machine and which is judged to be of the second kind information "(-) or no symbol" or to be of the third kind information "U". In this case, it is desirable that data on such a sequence program can be written into the safety PLC even if the judgment result of the output of the sequence program is the second kind information "(-) or no symbol" or the third kind information "U". For example, when the user selects an output device name which can be (exceptionally) disregarded, from outputs having been judged to be of the second kind information "(-) or no symbol" or the third kind information "U", it becomes possible for the preparation supporting software for sequence programs to write the data on the sequence program into the safety PLC even if the judgment result of an output having the selected output device name is the second kind information or the third kind information.

[Example of Case That Output of Certain Sequence Program is Used as Input Device of Another Sequence Program (FIG. 7)]

Of sequence programs, there exists one which is configured by combining input devices of several tens to several hundreds. In such a case, instead of being configured as a single program, the sequence program is divided into a plurality of sequence programs, in which case an output section of a certain sequence program is configured to be used as an input, device in another sequence program. This can make the preparation (alteration), maintenance and the like very convenient to the user.

Alternatively, where a plurality of sequence programs include identical circuits (identical ladder circuits) at their parts, these identical circuits are configured as one sequence program, and an output of the sequence program is configured to be utilized in a plurality of sequence programs. This can also make the preparation (alteration), maintenance and the like very convenient to the user.

FIG. 7(A) shows an example that output sections (output M002 and output M003) of sequence programs "002" and "003" are utilized as input devices in a sequence program "004".

In this case, in the sequence program "002", the output M002 is judged to be of "S" because the input I001"S" and the input I002"S" are in a serial configuration. Further, in the sequence program "003", the output M003 is judged to be of "(-) or no symbol" because the input I003"(-) or no symbol" and the input I004"(-) or no symbol" are in a serial configuration. Furthermore, in the sequence program "004", the output M004 is judged to be of "S" because the input M002"S" (the use of the output M002) and the input M003"(-) or no symbol" (the use of the output M003) are in a serial configuration. The way of making judgment has already been described and hence, will be omitted from description.

Description will be made of an example (refer to FIG. 7(B)) that the user modifies the sequence program "002" from the aforementioned state shown in FIG. 7(A) to add an input I005"(-) or no symbol" in parallel with the input I001"S" as well as with the input I002"S".

Figure 5:
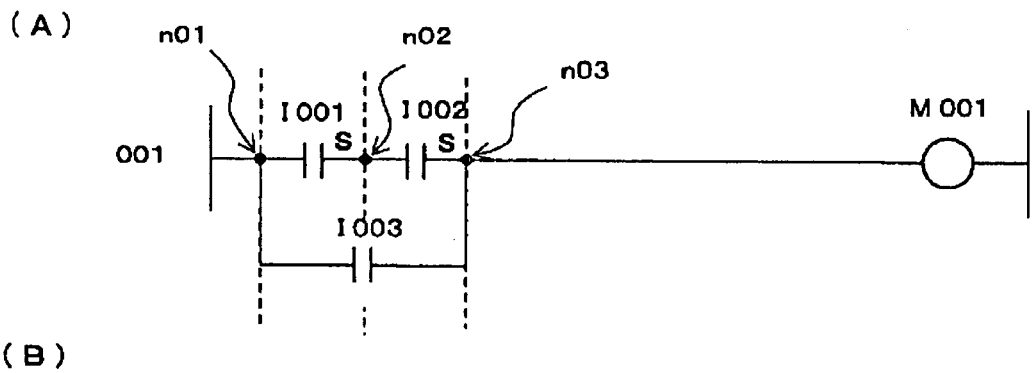
FIG. 5 is explanatory views for the procedure in which preparation supporting software for sequence programs judges a sequence program automatically.
Figure 5:
Figure 5:
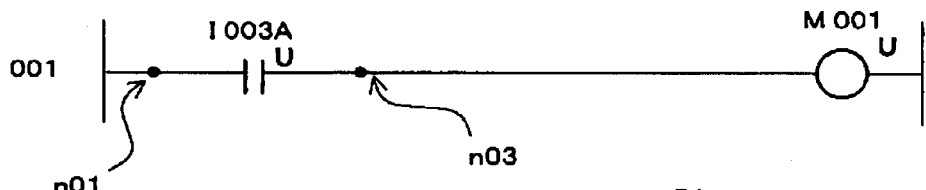
Figure 6:
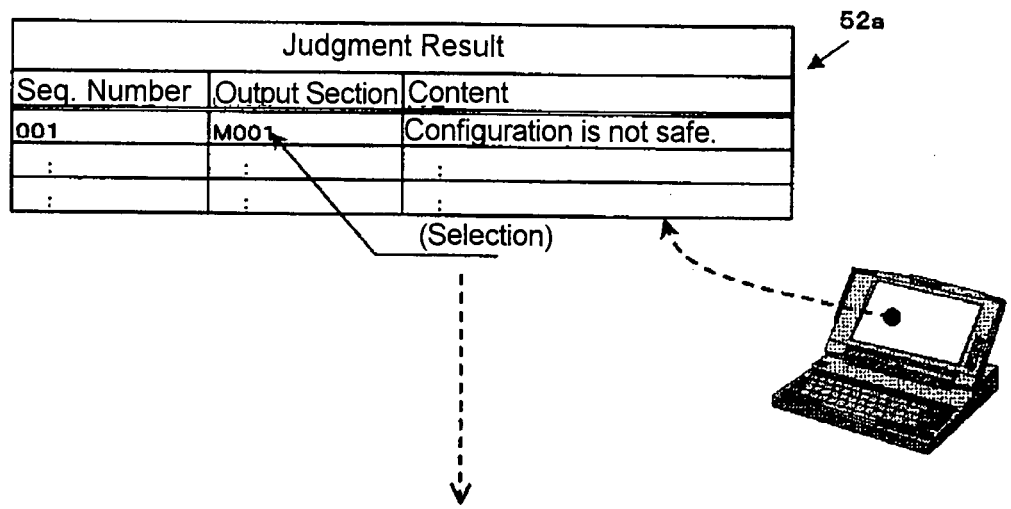
FIG. 6 is explanatory views exemplifying the display of a judgment result by the preparation supporting software for sequence programs.
Figure 6:
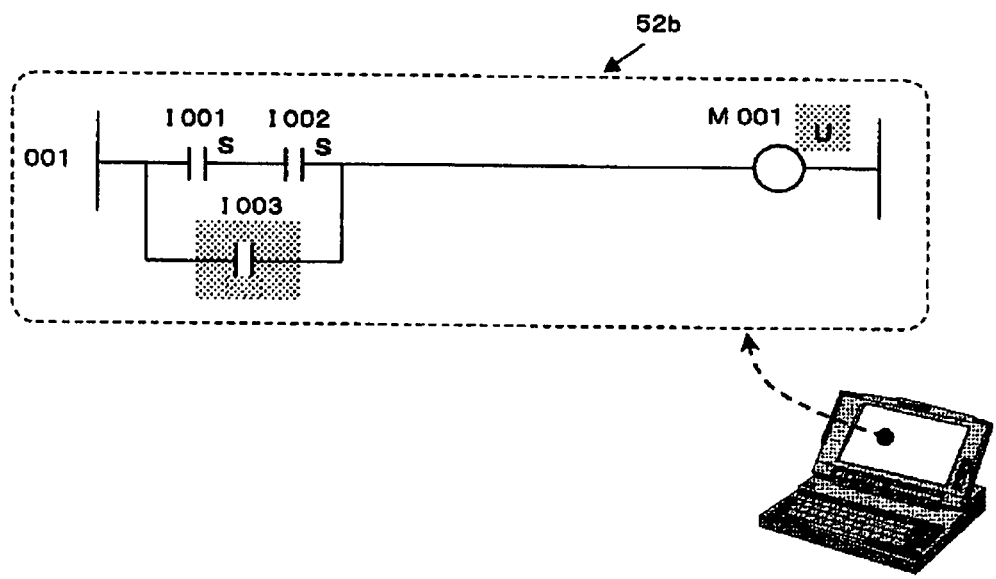
Figure 7:
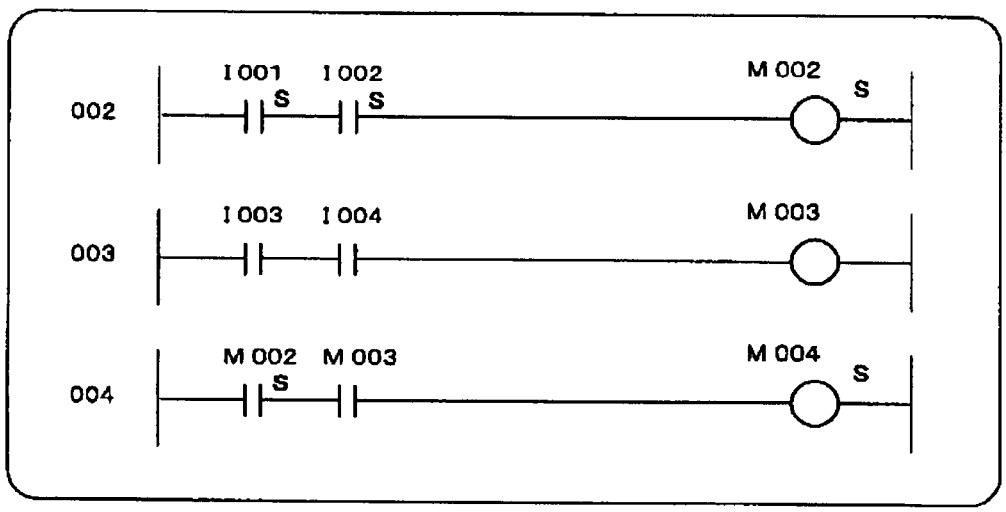
FIG. 7 is explanatory views exemplifying the display of a judgment result by the preparation supporting software for sequence programs in the case that an output section of a certain sequence program is utilized as an input device in another sequence program.
Figure 7:
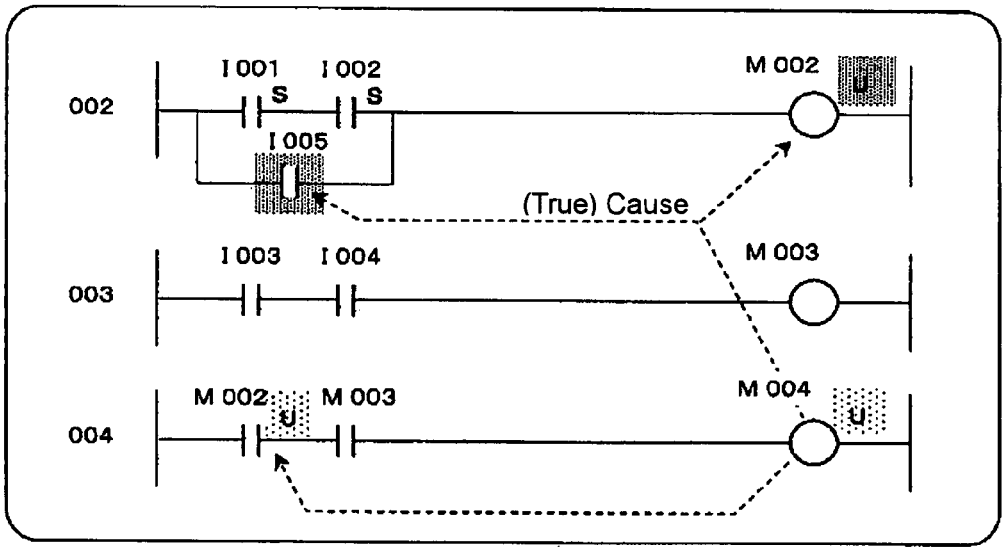

First, the preparation supporting software for sequence programs judges that the output M002 of the sequence program "002" is of "U" (the description of which will be omitted because it is the same as that in FIG. 5 and FIG. 6). The judgment result is stored at a part for sequence number "002" of the judgment record information 51c shown in FIG. 7(C). The manner of storing it is the same as that described with reference to FIG. 5(D) and hence, will be omitted from description.

Then, the preparation supporting software for sequence programs judges that the output M003 of the sequence program "003" is of "(-) or no symbol". The judgment result is stored at a part for sequence number "003" of the judgment record information 51c shown in FIG. 7(C).

Then, the preparation supporting software for sequence programs judges that the output M004 of the sequence program "004" is of "U", based on the judgment results of the output M002 and the output M003. The judgment result is stored at a part for sequence number "004" of the judgment record information 51c shown in FIG. 7(C).

Because there is a case that an output of a certain sequence program is utilized as an input device of another sequence program, the preparation supporting software for sequence programs repeats the judgment processing many times until the output of the judgment result comes to change no longer.

Then, the preparation supporting software for sequence programs displays a judgment result screen shown in FIG. 6(A) to display "M004" at the "output section" and to display "Configuration is not safe." (not a safe configuration or the like) at the "content". If the user here selects "M004" having been judged not to be safe on the judgment result screen, the preparation supporting software for sequence programs displays the sequence program "004" which includes the output "M004" at its output section and the sequence program "002" which caused the output M004 of the sequence program "004" to be judged as "U". In this case, it does not matter whether to display the sequence program "003" or not.

Further, the preparation supporting software for sequence programs displays at least one of the output M002 of the sequence program "002" which made such cause and the input I005 in a manner of enabling the user to distinguish it (refer to FIG. 7(B)). The procedure therefor will be described hereinafter.

The preparation supporting software for sequence programs searches the "output section" of the judgment record information 51c for "M004" selected by the user. Then, it searches a "line" including "M004" for an "input n" with which "U" has been stored at "input n judgment". In this case, "M002" is extracted as the search result.

Further, the preparation supporting software for sequence programs makes a search of whether or not the extracted "M002" is present at "output section". In this case, sequence number "002" is extracted. Then, the "line" including "M002" is searched for an "input n" with which "U" has been stored at "input n judgment". In this case, "I005" is extracted as the search result.

Further, the preparation supporting software for sequence programs makes a search of whether or not the extracted "I005" is present at "output section". In this case, since "I005" is not present at "output section", the search is terminated at this stage. As a result of the aforementioned searches, the preparation supporting software for sequence programs judges that the (true) cause which resulted in judging the output M004 to be of "U" is the "input I005" in the sequence program of sequence number "002".

Based on this judgment result, the preparation supporting software for sequence programs is enabled to display at least one of the output M002 of the causing sequence program "002" and the input I005 in the manner of enabling the user to distinguish it.

[Example of Making Safety PLC Execute Automatic Judgment of Output Section of Sequence Program]

In the embodiment as described above, description has been made regarding the example that the terminal device 50 is made to execute the automatic judgment of output sections of sequence programs by the use of the preparation supporting software for sequence programs. However, it is also possible to incorporate software for such automatic judgment into the safety PLC 1.

Figure 2:
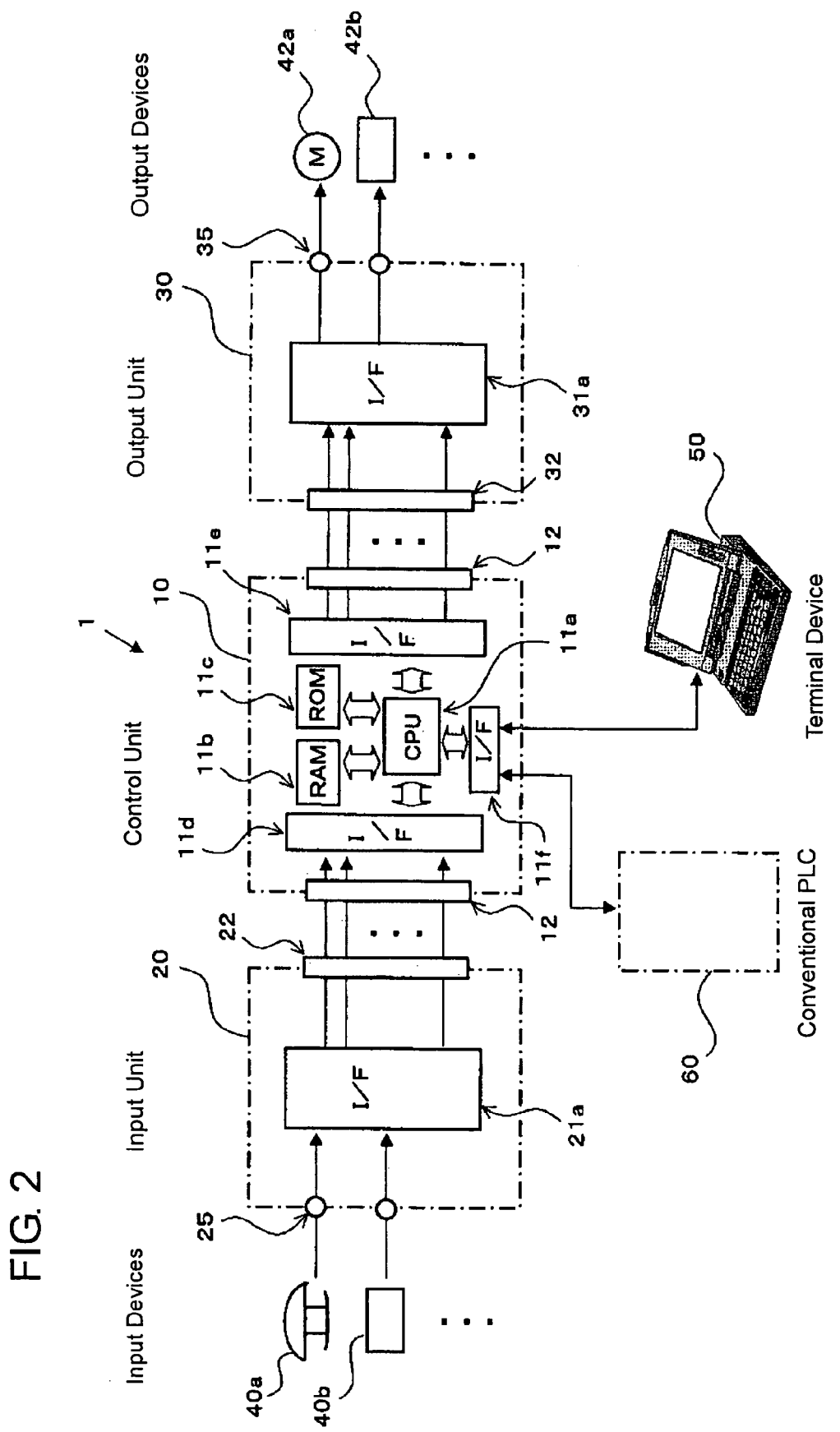
FIG. 2 is a diagram explaining an example of the block construction and connection of the safety PLC 1.

For example, a judgment program for practicing the aforementioned judgment method is stored in the ROM 11c shown in FIG. 2. Then, configuration is taken so that at a predetermined timing such as, for example, at the time of inputting the electric power to the safety PLC 1, the CPU 11a first executes the judgment program to judge whether outputs of sequence programs are of the configuration ensured to be safe or not. Further, configuration is also taken so that when the CPU 11a judges that the output of a sequence program is not safe (judges as the second kind information or the third kind information), alerting means (e.g., abnormal lamp, buzzer or the like) outputs an alert signal to control an output device connected to the output section toward safe side (toward stop side).

The safety PLC, the preparation supporting software for sequence programs and the judgment method for sequence programs according to the present invention are not limited to the shape, construction, structure, operation, processing procedure, processing method and so on which have been described in the present embodiment, and can be subjected to various modifications, additions and deletions within the extent that does not change the gist of the present invention.

Figure 4:
FIG. 4 is explanatory views of base rules in automatic judgment (judgment on the output of a sequence program)
Figure 4:
Figure 4:
Figure 4:
Figure 4:
Figure 4:
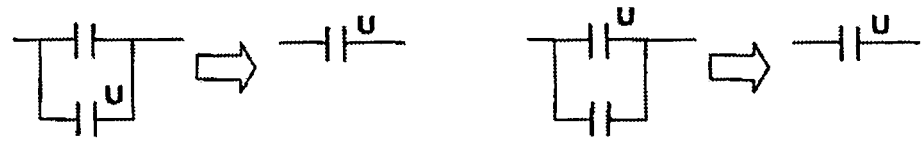

The judgment (base) rules in the present embodiment are not limited to the rules shown in FIG. 4 and can be subjected to additions, modifications and the like to meet input devices of various types such as input devices of normally-closed type (the default state thereof being a conductive state), input devices of self-holding type (remaining in ON-state once turned ON) and the like.

Further, the display method is not limited to the display method exemplified in the present embodiment.

INDUSTRIAL APPLICABILITY

As described above, the safety PLC, the preparation supporting software for sequence programs and the judgment method for sequence programs according to the present invention are capable of automatically judging whether an output section of a sequence program is the output ensured to be safe or not and of enabling the user to judge whether it is the output ensured to be safe or not, in a shorter period of time and more accurately, and therefore, are suitable to be used in preparing sequence programs wherein input devices ensured to be safe coexist with input devices not ensured to be safe.

The invention claimed is:

1. A safety PLC capable of rewriting sequence programs, comprising:
   input means for inputting signals relating to the conductive states of a plurality of input devices;
   storage means for storing sequence programs each configured by combining arbitrary input devices selected from the inputted input devices in serial or parallel and for storing input device information which classifies each of the input devices as providing either first information indicative of safety ensured or second information indicative of safety not ensured; and
   arithmetic means for obtaining an arithmetic result based on a sequence program and signals relating to the conductive states of respective input devices; and
   output means for outputting the arithmetic result of the arithmetic means from an output section to control an output device,
   wherein the safety PLC judges whether or not the arithmetic result outputted to the output section is of a configuration ensured to be safe, based on stored rules for identifying the arithmetic result as safe or not safe, the stored rules considering the sequence program and the input device information and,
   when judging that the configuration is not ensured to be safe, the safety PLC sends an output to alerting means and controls an output device connected to the output section toward a safe side.

2. Preparation supporting software for sequence programs in a safety PLC capable of rewriting sequence programs, the PLC comprising:
   input means for inputting signals relating to the conductive states of a plurality of input devices;
   storage means for storing sequence programs each configured by combining arbitrary input devices selected from the inputted input devices in serial or parallel and for storing input device kind information which classifies each of the input devices as providing either first information indicative of safety ensured or second information indicative of safety not ensured;
   arithmetic means for obtaining an arithmetic result based on a sequence program and signals relating to the conductive states of respective input devices; and output means for outputting the arithmetic result of the arithmetic means from an output section to control an output device, wherein the preparation supporting software for sequence programs judges whether or not an output section corresponding to an object sequence program is of the configuration ensured to be safe, based on rules for identifying the arithmetic result as safe or not safe, the stored rules considering the input device information, and the object sequence program and distinguishably displays a result of the judgment.

3. The preparation supporting software for sequence programs as set forth in claim 2, wherein:

when judging that the output section corresponding to the object sequence program is not of the configuration ensured to be safe, the preparation supporting software for sequence programs can be set to prohibit the writing of the object sequence program into the safety PLC.

4. The preparation supporting software for sequence programs as set forth in claim 2, wherein:

the preparation supporting software for sequence programs enables a plurality of sequence programs to be prepared and also enables an output section of one sequence program to be utilized as an input device of another sequence program; and when an output section judged not to be of the configuration ensured to be safe is selected, the preparation supporting software for sequence programs displays a sequence program which includes an output section first judged not to be of the configuration ensured to be safe and which is selected from among the sequence program and other sequence programs including a cause which made the output section judged not to be of the configuration ensured to be safe, and at the same time, distinguishably displays at least one of an input device and an output device which contributed to the cause in the displayed sequence program.

5. A judgment method for sequence programs for judging whether or not an output section of an object sequence program is ensured to be safe, in the safety PLC as set forth in claim 1, wherein the method comprises the steps of:

classifying judgment results into first information indicative of safety ensured at all times, second information indicative of safety not ensured at all times and third information indicative of safety not ensured as a result that there may be both of a case that safety is ensured and the other case that safety is not ensured;

when a sequence program is composed of input devices of the first information only, judging the judgment result of an output section thereof to be the first information;

when a sequence program is composed of input devices of the second information only, judging the judgment result of an output section thereof to be the second information;

when a sequence program includes input devices of the first information together with input devices of the second information, judging that the judgment result of an output section of the sequence program is the first information unless a part where the conductive state of an input device of the second information has preference to the conductive state of an input device of the first information is detected at any part along the routes to the output section of the sequence program, and judging that the judgment result of the output section of the sequence program is the third information if a part where the conductive state of an input device of the second information has preference to the conductive state of an input device of the first information is detected at at least a part along the routes to the output section of the sequence program.

6. A judgment method for sequence programs for judging whether or not an output section of an object sequence program is ensured to be safe, in the preparation supporting software for sequence programs as set forth in claim 2, wherein the method comprises the steps of:

classifying judgment results into first information indicative of safety ensured at all times, second information indicative of safety not ensured at all times and third information indicative of safety not ensured as a result that there may be both of a case that safety is ensured and the other case that safety is not ensured;

when a sequence program is composed of input devices of the first information only, judging the judgment result of an output section thereof to be the first information;

when a sequence program includes input devices of the first information together with input devices of the second information, judging that the judgment result of an output section of the sequence program is the first information unless a part where the conductive state of an input device of the second information has preference to the conductive state of an input device of the first information is detected at any part along the routes to the output section of the sequence program, and judging that the judgment result of the output section of the sequence program is the third information if a part where the conductive state of an input device of the second information has preference to the conductive state of an input device of the first information is detected at at least a part along the routes to the output section of the sequence program.

* * * * *